Jan. 27, 1970  V. R. RINEHART  3,492,334
PURIFICATION OF BIS HYDROXYETHYL TEREPHTHALATE
Filed April 20, 1964
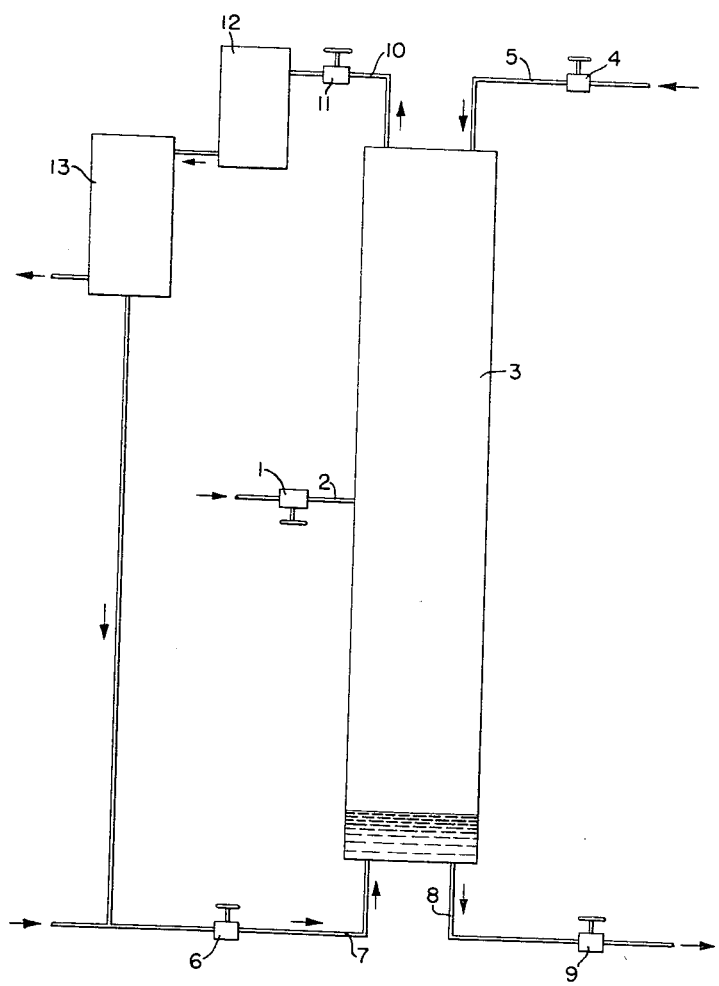
INVENTOR.
VERNE R. RINEHART
BY
J.B. Holden
ATTORNEY

United States Patent Office 3,492,334
Patented Jan. 27, 1970

3,492,334
PURIFICATION OF BIS HYDROXYETHYL
TEREPHTHALATE
Verne R. Rinehart, Bath, Ohio, assignor to The Goodyear Tire & Rubber Company, Akron, Ohio, a corporation of Ohio
Filed Apr. 20, 1964, Ser. No. 360,984
Int. Cl. C07c 69/82
U.S. Cl. 260—475          1 Claim This invention relates to the purification of bis hydroxyethyl terephthalate. More particularly, the invention relates to the separation of bis hydroxyethyl terephthalate in a high state of purity from the mixture obtained when terephthalic acid is reacted with ethylene exide in aqueous medium in the presence of an alkaline catalyst.

Bis hydroxyethyl terephthalate obtained by reacting terephthalic acid with ethylene oxide is generally contaminated with unreacted terephthalic acid, the monohydroxyethyl ester of terephthalic acid, salts, polyether glycols and some colored impurities which are difficult to remove. The color impurities seem to be closely associated with the bis hydroxyethyl terephthalate and stay with it even through crystallization procedures.

It is an object of the present invention to provide an improved process for the separation of bis hydroxyethyl terephthalate from such impurities and to provide a method for the purification of bis hydroxyethyl terephthalate whereby it is obtained in a high state of purity and has little or no color.

In accordance with the invention mixtures obtained in reacting terephthalic acid with ethylene oxide in aqueous medium are subjected to a treatment which separates the bis hydroxyethyl terephthalate from unreacted terephthalic acid, salts of terephthalic acid, half esters of terephthalic acid and polyglycols formed by the condensation of ethylene oxide or ethylene glycol, and the partially purified bis hydroxyethyl terephthalate, in water solution, is subjected to liquid-liquid extraction in a suitable extraction zone at a temperature which is sufficiently high to insure that the bis hydroxyethyl terephthalate remains dissolved.

The liquid-liquid extraction may be carried out in any suitable type of apparatus which assures efficient contact of the two phases. Suitable apparatus may be extraction columns provided with suitable means such as inert packing, perforated plates, bubble plates, grid trays or baffles which assure efficient mixing and contact of the two phases. The solution to be extracted in such an apparatus is passed through the column and concurrently a second phase is passed in the opposite direction. Conventional means are provided for the control of the temperature so that the mixture may be maintained entirely in liquid state. The extraction can be carried out batchwise or if desired it can be performed in a continuous operation in an apparatus of the column type.

The two phases required for the liquid-liquid extraction can be caused to form by two methods. In one method the addition of an electrolyte to the aqueous solution of bis hydroxyethyl terephthalate reduces the solubility of the bis hydroxyethyl terephthalate in water sufficiently that a portion separates into a second phase. In the second method a solvent is added and the mixture forms two phases. In both cases both phases contain bis hydroxyethyl, but the organic phase conains a higher percentage of color bodies with respect to the dissolved bis hydroxyethyl terephthalate.

Various electrolytes can be used to cause two phases to form. Common salt (NaCl) is quite effective in the process. It is readily available and economical. In addition to salt, equivalent amounts of other electrolytes that do not promote the hydrolysis of bis hydroxyethyl terephthalate can be used. The term "equivalent amounts" is used to mean amounts that will produce substantially the same number of dissolved particles as is produced by sodium chloride when it is dissolved in water in accordance with the practice of this invention. Representative examples of such electrolytes are sodium sulfate, potassium chloride, potassium sulfate, calcium chloride, magnesium sulfate, etc.

Solvents used in forming the second phase in the invention should have certain characteristics in order for the process to operate efficiently. For example, the solvent must not be too soluble in the aqueous phase, a solubility of not over 15 percent is desirable. In addition, the solvent must be one that is easily removed from both the water solution and from the bis hydroethyl terephthalate so that the bis hydroxyethyl terephthalate can be obtained in pure form. The density of the solvent phase should be sufficiently different from the density of the aqueous phase that the two can be separated. Representative examples of solvents which can be used are ethylene dichloride, dimethyl isophthalate, a mixture of ethylene dichloride with dimethyl terephthalate, dimethyl-orthophthalate, tricresylphosphate and ethoxy-1-diethoxy ethyl phthalate.

The practice of the invention is illustrated by the following examples.

Bis hydroxethyl terephthalate was prepared by reacting terephthalic acid with ethylene oxide in aqueous medium in the presence of a small amount of sodium hydroxide as catalyst as in Example 1 below.

EXAMPLE 1

109 grams of sodium hydroxide dissolved in 10 pounds of water and 6 pounds of terephthalic acid were placed in a five gallon stainless steel pressure vessel which was equipped with a stirrer. The reactor was closed and 4.2 pounds of ethylene oxide were charged in. The agitator was stated and the mixture was heated to 45° C. Nitrogen gas was run in to adjust the pressure in the reactor to 50 pounds per square inch gauge pressure at 45° C. The mixture was then heated to 125° C. When the pressure in the reactor dropped to 50 pounds per square inch gauge pressure the reaction was substantially complete. The pressure in the system was brought to atmospheric pressure and the reaction mixture was discharged from the reactor. The mixture obtained was filtered to remove unreacted terephthalic acid and then cooled to room temperature. The bis hydroxeythyl terephthalate crystallized and was recovered by filtration. This bis hydroxeythyl terephthalate had a color of 3.5.

EXAMPLE 2

Sufficient bis hydroxyethyl terephthalate which had been prepared as in Example 1 was dissolved in hot water to make four liters of a 40 percent solution. This solution was placed in a large glass flask and its temperature was raised to a temperature of 40 to 45° C. and maintained in this range by heating it with a hot plate. One liter of ethylene dichloride was added and the mixture was vigorously stirred to bring the water solution into intimate contact with the ethylene dichloride. After the mixture had been stirred for a few minutes stirring was stopped and the mixture was allowed to separate into two phases. The aqueous phase rose to the top. The aqueous phase was decanted off and cooled. The bis hydroxyethyl terephthalate crystallized out and recovered by filtration. The organic phase remaining was washed six times with four liters of water to recover most of the bis hydroxyethyl terephthalate contained in it. This bis hydroxyethyl terephthalate was recovered from the water washings and added to the bis hydroxyethyl terephthalate recovered from the aqueous layer that was decanted as set out above. The entire batch of bis hydroxyethyl terephthalate was dissolved in water and the solution made up to a total volume of four liters and the process was repeated. After six extractions in this manner the bis hydroxyethyl terephthalate had a color rating of 0.50 on a laboratory color scale. A sample of the bis hydroxyethyl terephthalate was condensed to form highly polymeric polyester using a zinc acetate-antimony catalyst. The polyester prepared had a color rating of 0.75 on the standard laboratory color comparison scale.

Color standards

Aqueous solutions of Du Pont Pontamine Catecher 3-G dye were made in various concentrations to use as color standards:

| Color units: | Dye concentration |
|---|---|
| 0 | Water. |
| 0.5 | 0.000125 gram of dye per 100 ml. of solution. |
| 1 | 0.00025 gram of dye per 100 mls. of solution. |
| 2 | Twice as much dye as 1. |
| 3 | Three times as much dye as 1. |
| 4 | Four times as much dye as 1. |
| 5 | Five times as much dye as 1. |
| 6 | Six times as much dye as 1. |
| 7 | Seven times as much dye as 1. |
| 8 | Eight times as much dye as 1. |
| 10 | Ten times as much dye as 1. |

To determine the color rating of a sample the colored solutions were compared with the sample of polymer or bis hydroxyethyl terephthalate in molten state and the number selected which most closely matches the sample.

The above example illustrates the process using an organic solvent for the extraction. The process of the invention can also be carried out using aqueous solutions of electrolytes in the place of the organic solvent used above. This is illustrated in the following example.

EXAMPLE 3

Four liters of a hot 40 percent water solution of bis hydroxyethyl terephthalate which had been prepared and crystallized as in Example 1 were placed in a large glass flask and its temperature was maintained in the range of from 40 to 45° C. 300 grams of sodium chloride were added and the mixture was stirred until the salt was completely dissolved. Then the mixture was allowed to stand without agitation for a short time. It separated into two layers. The top layer was an aqueous salt solution containing relatively pure bis hydroxyethyl terephthalate, and the bottom layer was impure bis hydroxyethyl terephthalate containing a small amount of salt solution. The top layer was decanted off and cooled. The bis hydroxyethyl terephthalate crystallized and was recovered by filtration. The bottom layer was washed six times with four liters or salt solution which contained 75 grams of salt per liter of solution to extract most of the bis hydroxyethyl terephthalate. After the final extraction the bis hydroxyethyl terephthalate was crystallized and recovered by filtration. The entire batch of bis hydroxyethyl terephthalate was dissolved in water treated and extracted as above six times. A sample of the bis hydroxyethyl terephthalate thus purified was condensed to form a highly polymeric polyester using a zinc acetate antimony catalyst. The polyester prepared had a color rating of 0.75 on the laboratory color scale.

The above example illustrates the process using salt in a concentration of 75 grams per liter of water. More or less salt can be used, if desired. Preferably more than 50 grams per liter of water will be used so that the operating temperature used will be such that both phases are liquid and the bis hydroxyethyl terephthalate layer will be liquid rather than a solid.

The invention has been illustrated by examples showing batch procedures. The process can also be operated continuously as shown below.

EXAMPLE 4

Referring now to the drawing a feed solution of a 40 percent aqueous solution of bis hydroxyethyl terephthalate is introduced through valve 1 and conduit 2 into column 3, packed with Berl saddles, at a point about midway between the ends of the column 3. Simultaneously, ethylene dichloride is introduced through valve 4 and pipe 5 into the top of the column 3 and wash water is introduced through valve 6 and pipe 7 at the bottom of the column 3. The materials are fed into the column 3 in the ratio of about one volume of ethylene dichloride to about four volumes of feed solution to about 16 volumes of wash water. The feed solution forms a continuous phase that flows upwardly through the column. The ethylene dichloride forms a discontinuous phase that passes downwardly as small droplets. The feed is washed by the ethylene dichloride as it flows in the opposite direction. The ethylene dichloride extracts a portion of the bis hydroxyethyl terephthalate and color bodies from the feed solution as the two contact each other. Below the point of introduction of the feed solution the ethylene dichloride contacts the wash water which extracts bis hydroxyethyl terephthalate from the ethylene dichloride and as the wash water flows upwardly it mixes with the feed solution and forms part of the continuous phase. When ethylene dichloride reaches the bottom of the column it contains a very small percentage of bis hydroxyethyl terephthalate and the color forming bodies that were associated with the bis hydroxyethyl terephthalate in the feed solution. It is drawn off from the column 3 through pipe 8 and valve 9 and sent to solvent recovery unit not shown where it is purified and returned to the process. The washed feed solution (diluted with the wash water) passes to the top of the column and is drawn off through pipe 10 and valve 11 and sent to crystallizer 12 where it is cooled and the bis hydroxyethyl terephthalate crystallized. The slurry of crystals and water is filtered at filter station 13 and the bis hydroxyethyl terephthalate is filtered off and dried in a drying apparatus not shown. The filtrate of water containing a small amount of bis hydroxyethyl terephthalate is returned to the process by sending it back to the wash water and reintroducing it to the apparatus.

The process using salt solution is similar and comprises forming a feed solution of bis hydroxyethyl terephthalate in water, continuously introducing the feed solution into a vertical packed column at a point about midway between the ends of the column, introducing salt solution into the column at the bottom of the column, the salt solution flowing upwardly through the column and forming a phase with the feed solution, removing the aqueous organic phase at the top of the column and recovering the bis hydroxyethyl terephthalate from it, melting the bis hydroxyethyl terephthalate recovered, drawing off a portion of the melted bis hydroxyethyl terephthalate and reintroducing the remainder of the recovered bis hydroxyethyl terephthalate into the top of the column and forming a discontinuous phase of bis hydroxyethyl terephthalate and water and flowing said discontinuous phase downwardly through the column and removing the discontinuous phase as it collects at the bottom of the column.

In continuously operating an extraction of the above type it sometimes is desirable to submit the bis hydroxyethyl terephthalate obtained from the crystallizer to further extraction. In such case the dried bis hydroxyethyl terephthalate is melted and a portion of its is reintroduced at the top of the column and flowed downwardly through the apparatus is the discontinuous phase while simultaneously it is extracted by the aqueous phase and recovered as shown in the example above. This procedure may be used when the original bis hydroxyethyl terephthalate is very darkly colored and extremely pure product is desired.

The invention has been illustrated showing extraction at a temperature in the range of 40 to 45° C. The temperature employed in the extraction may be varied considerably. In general it is necessary to employ a temperature high enough to insure that the bis hydroxyethyl terephthalate remains dissolved and low enough that difficulties are not encountered due to boiling of the solvents or the water present. Thus the temperature used in the extraction may vary from 40° C. to the boiling point of the solvent-water azeotrope or to the boiling point of water if that is lower than the boiling point of the solvent-water azeotrope. The preferred temperature range is in the range of from 40 to 55° C.

The pressure may also be varied widely. Atmospheric pressure or superatmospheric pressure may be employed. Generally the extraction will be run at approximately atmospheric pressure.

The solvents used can be removed from the bis hydroxyethyl terehthalate and recovered by methods which will be familiar to those skilled in the art. For example, ethylene dichloride can be recovered by simple distillation or by steam distillation. Dimethyl isophthalate dimethyl terephthalate and dimethyl-ortho-phthalate can be readily recovered by steam distillation. The other solvents used can similarly be recovered by the standard well-known procedures for recovering such materials.

While certain representative embodiments and details have been shown for the purpose of illustrating the invention it will be apparent to those skilled in this art that various changes and modifications may be made therein without departing from the spirit or scope of the invention.

What I claim is:

1. The process which comprises forming a feed solution of bis hydroxyethyl terephthalate in water, continuously introducing the feed solution into a vertical packed column at a point about midway between the ends of the column, simultaneously introducing into the top of the column a stream of ethylene dichloride which forms a discontinuous phase, said discontinuous phase flowing downwardly through the column, introducing water into the column at a point near the bottom of the column, the water flowing upwardly and washing the discontinuous phase as it passes through the column, removing water containing dissolved bis hydroxyethyl terephthalate at the top of the column and recovering the bis hydroxyethyl terephthalate from the water while removing the discontinuous phase at the bottom of the column at about the rate at which it is added to the top of the column.

References Cited

UNITED STATES PATENTS 2,877,262   3/1959   Binder et al. _____ 260—475

OTHER REFERENCES

Weissberger, Separation Purification, vol. III, pp. 355–357.

LORRAINE A. WEINBERGER, Primary Examiner

E. J. SKELLY, Assistant Examiner